United States Patent
Grimm et al.

(10) Patent No.: US 11,429,185 B2
(45) Date of Patent: Aug. 30, 2022

(54) APPARATUS AND METHOD FOR ASSESSING OCCUPANT GAZES

(71) Applicant: GM GLOBAL TECHNOLOGY OPERATIONS LLC, Detroit, MI (US)

(72) Inventors: Donald K. Grimm, Utica, MI (US); Beñat Irastorza-Ugalde, Ordizia (ES); Guillaume Trehard, Oberschleißheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 413 days.

(21) Appl. No.: 16/576,059

(22) Filed: Sep. 19, 2019

(65) Prior Publication Data
US 2021/0089120 A1 Mar. 25, 2021

(51) Int. Cl.
| | |
|---|---|
| *G06F 3/01* | (2006.01) |
| *G06T 7/73* | (2017.01) |
| *G06T 7/60* | (2017.01) |
| *B60W 30/18* | (2012.01) |
| *B60W 50/14* | (2020.01) |
| *B60W 50/00* | (2006.01) |
| *G05D 1/00* | (2006.01) |

(52) U.S. Cl.
CPC ............ *G06F 3/013* (2013.01); *B60W 30/18* (2013.01); *B60W 50/14* (2013.01); *G06T 7/60* (2013.01); *G06T 7/73* (2017.01); *B60W 2050/0072* (2013.01); *G05D 1/0088* (2013.01); *G06T 2207/30201* (2013.01); *G06T 2207/30252* (2013.01); *G06T 2207/30268* (2013.01)

(58) Field of Classification Search
CPC ....... G06F 3/013; B60W 30/18; B60W 50/14; B60W 2050/0072; B60W 40/072; B60W 2540/225; B60W 60/0053; B60W 40/08; B60W 2050/143; B60W 2050/146; B60W 2420/403; B60W 2420/52; B60W 2420/54; G06T 7/60; G06T 7/73; G06T 2207/30201; G06T 2207/30252; G06T 2207/30268; G05D 1/0088; G06K 9/00597; G06K 9/00845
See application file for complete search history.

(56) References Cited

U.S. PATENT DOCUMENTS

2010/0253489 A1\* 10/2010 Cui ................... G01S 13/867
340/425.5

\* cited by examiner

*Primary Examiner* — Yuen Wong
(74) *Attorney, Agent, or Firm* — Cantor Colburn LLP

(57) ABSTRACT

A method of assessing a gaze of an occupant is provided. The method includes: determining a direction of a gaze of an occupant based on gaze information detected by a first sensor; determining a position of a feature of road based on one or more from among mapping information or vehicle environment information provided by a second sensor; comparing the direction of the gaze to the position of the feature of the road; and performing a corrective action in response to determining that the direction of the gaze does not correspond to the position of the feature of the road.

9 Claims, 4 Drawing Sheets

APPARATUS AND METHOD FOR ASSESSING OCCUPANT GAZES

INTRODUCTION

Apparatuses and methods consistent with exemplary embodiments relate to gaze tracking and detection. More particularly, apparatuses consistent with exemplary embodiments relate to assessing a gaze of an occupant.

SUMMARY

One or more exemplary embodiments provide an apparatus capable of assessing a gaze of an occupant as it relates to a feature of the road. More particularly, one or more exemplary embodiments provide an apparatus that is capable of performing a corrective action in response to determining that the direction of the gaze does not correspond to the position of the feature of the road.

According to an aspect of an exemplary embodiment, a method for assessing a gaze of an occupant is provided. The method includes determining a direction of a gaze of an occupant based on gaze information detected by a first sensor, determining a position of a feature of road based on one or more from among mapping information or vehicle environment information provided by a second sensor, comparing the direction of the gaze to the position of the feature of the road, and performing a corrective action in response to determining that the direction of the gaze does not correspond to the position of the feature of the road.

The feature of the road may be road geometry including one or more of a curvature change of the road and an elevation change of the road.

The comparing the direction of the gaze to the position of the feature of the road may include comparing the direction of the gaze to the curvature change or the elevation change of the road by identifying curve segment parameters or elevation change segment parameters and comparing the position of the gaze of the occupant to the curve segment parameters or the elevation change segment parameters at a plurality of points in time.

The curve segment parameters or the elevation change segment parameters may be identified from the mapping information retrieved from storage, and the comparing is performed as the curve segment or the elevation change segment is traversed.

The curve segment parameters or the elevation change segment parameters may be identified from the information provided by the sensor, and the comparing may be performed after the curve segment or the elevation change segment is traversed.

The performing the corrective action may include one or more from among providing a warning to the occupant to keep eyes on the road, notifying the occupant to take over steering of a vehicle, disengaging automated vehicle driving controls, and stopping the vehicle.

The feature of the road may include a traffic control object or device.

The comparing the direction of the gaze to the position of the feature of the road may include projecting the direction of the gaze to a first position on an image plane and projecting the position of the feature to a second position on the image plane and determining whether the first position is within a predetermined distance of the second position.

The comparing the direction of the gaze to the position of the feature of the road may include determining whether the direction of the gaze is within a predetermined range set for a segment of the road being traveled on by the occupant.

The comparing the direction of the gaze to the position of the feature of the road may include determining whether the direction of the gaze is within a predetermined range set for a segment of the road being traveled on by the occupant.

A non-transitory computer readable medium may include instructions executable by a computer to perform the method.

According to an aspect of another exemplary embodiment, an apparatus that assesses a gaze of an occupant is provided. The apparatus includes at least one memory comprising computer executable instructions and at least one processor configured to read and execute the computer executable instructions. The computer executable instructions cause the at least one processor to determine a direction of a gaze of an occupant based on gaze information detected by a first sensor, determine a position of a feature of road based on one or more from among mapping information or vehicle environment information provided by a second sensor, compare the direction of the gaze to the position of the feature of the road, and perform a corrective action in response to determining that the direction of the gaze does not correspond to the position of the feature of the road.

The feature of the road may include road geometry including one or more of a curvature change of the road and an elevation change of the road.

The computer executable instructions may further cause the at least one processor to compare the direction of the gaze to the position of the feature of the road by comparing the direction of the gaze to the curvature change or the elevation change of the road by identifying curve segment parameters or elevation change segment parameters and comparing the position of the gaze of the occupant to the curve segment parameters or the elevation change segment parameters at a plurality of points in time.

The curve segment parameters or the elevation change segment parameters are identified from the mapping information retrieved from storage, and the computer executable instructions may cause the at least one processor to compare the direction of the gaze to the position of the feature of the road by comparing the direction of the gaze to the curvature change or the elevation change of the road as the curve segment or the elevation change segment is traversed.

The curve segment parameters or the elevation change segment parameters are identified from the information provided by the sensor, and the computer executable instructions may further cause the at least one processor to compare the direction of the gaze to the position of the feature of the road by comparing the direction of the gaze to the curvature change or the elevation change of the road after the curve segment or the elevation change segment is traversed.

The computer executable instructions may further cause the at least one processor to perform the corrective action by performing one or more from among providing a warning to the occupant to keep eyes on the road, notifying the occupant to take over steering of a vehicle, disengaging automated vehicle driving controls, and stopping the vehicle.

The feature of the road may be a traffic control object or device.

The computer executable instructions may further cause the at least one processor to compare the direction of the gaze to the position of the feature of the road by projecting the direction of the gaze to a first position on an image plane and projecting the position of the feature to a second position on the image plane and determining whether the first position is within a predetermined distance of the second position.

The computer executable instructions may further cause the at least one processor to compare the direction of the gaze to the position of the feature of the road by determining whether the direction of the gaze is within a predetermined range set for a segment of the road being traveled on by the occupant.

The computer executable instructions may further cause the at least one processor to compare a deviation of a direction of the gaze from a center value of the gaze.

The computer executable instructions may further cause the at least one processor to compare the direction of the gaze to the position of the feature of the road by determining whether the direction of the gaze corresponds to the position of the feature of the road for an amount greater than a threshold number over an analyzed period of time.

Other objects, advantages and novel features of the exemplary embodiments will become more apparent from the following detailed description of exemplary embodiments and the accompanying drawings.

DETAILED DESCRIPTION

Figure 1:
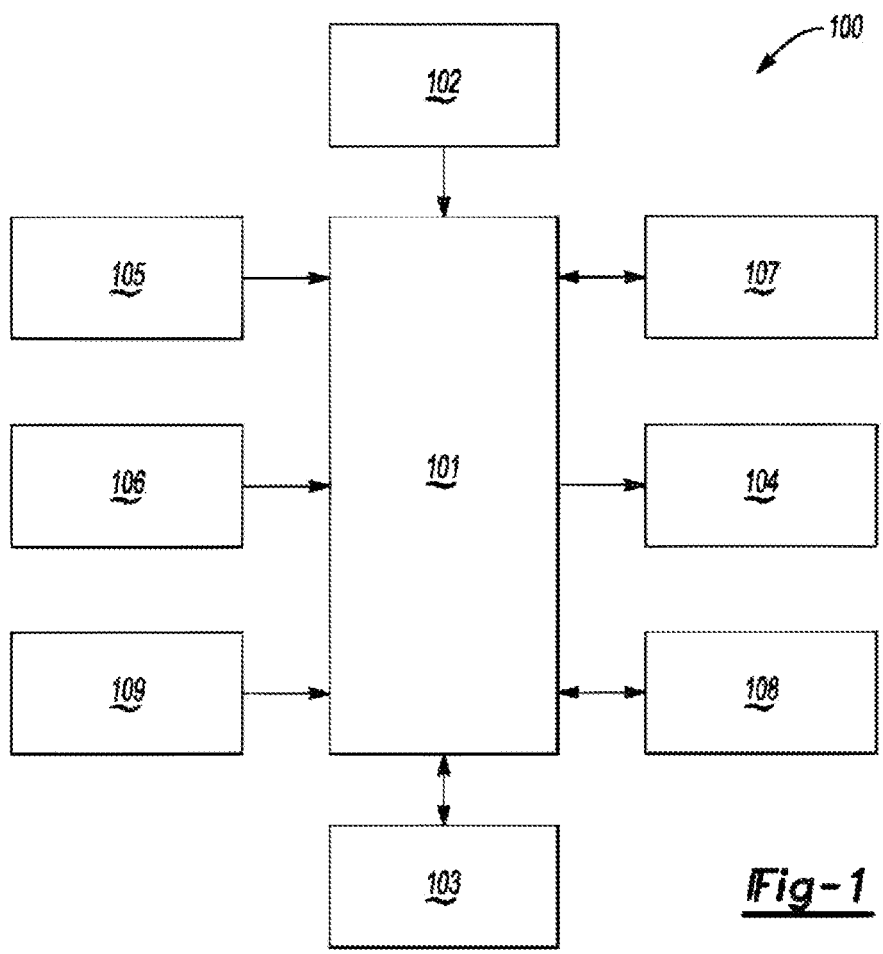
FIG. 1 shows a block diagram of an apparatus that assesses a gaze of an occupant according to an exemplary embodiment.

A method and apparatus for assessing a gaze of an occupant will now be described in detail with reference to FIGS. 1-4C of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

Vehicles may include gaze detection sensors that provide gaze information used to analyze the gaze of an occupant of the vehicle. The direction of the gaze may be determined from the gaze information and this may be compared to features of the occupant's or vehicle's environment such as features of the road. The comparison may be used to address issues with occupant attentiveness in autonomous or semi-autonomous vehicles. If an occupant is found to be inattentive, the vehicle may perform a corrective action to guide or force the occupant to pay attention to the environment of the vehicle.

FIG. 1 shows a block diagram of an apparatus that assesses a gaze of an occupant 100 according to an exemplary embodiment. As shown in FIG. 1, the apparatus that assesses a gaze of an occupant 100, according to an exemplary embodiment, includes a controller 101, a power supply 102, a storage 103, an output 104, a gaze detection sensor 105, a user input 106, vehicle system modules 107, a communication device 108, and environment perception sensors 109. However, the apparatus that assesses a gaze of an occupant 100 is not limited to the aforementioned configuration and may be configured to include additional elements and/or or omit one or more of the aforementioned elements.

The controller 101 controls the overall operation and function of the apparatus that assesses a gaze of an occupant 100. The controller 101 may control one or more of the storage 103, the output 104, the gaze detection sensor 105, the user input 106, the vehicle system modules 107, the communication device 108, and the environment perception sensors 109 of the apparatus that assesses a gaze of an occupant 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

The controller 101 is configured to send and/or receive information from one or more of the storage 103, the output 104, the gaze detection sensor 105, the user input 106, the vehicle system modules 107, the communication device 108, and the environment perception sensors 109. The information may be sent and received via a bus or network, or may be directly read or written to/from one or more of the storage 103, the output 104, the gaze detection sensor 105, the user input 106, the vehicle system modules 107, the communication device 108, and the environment perception sensors 109. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the storage 103, the output 104, the gaze detection sensor 105, the user input 106, the vehicle system modules 107, the communication device 108, and the environment perception sensors 109 of the apparatus that assesses a gaze of an occupant 100. The power supply 102 may include one or more from a battery, an outlet, a capacitor, a solar energy cell, a generator, a wind energy device, an alternator, etc.

The storage 103 is configured to store information and for retrieving information used by the apparatus that assesses a gaze of an occupant 100. The storage 103 may be controlled by the controller 101 to store and retrieve vehicle system information, vehicle environment information, gaze information, mapping information, etc. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The gaze information may include one or more from among an action of the user, visual information location, target name, a direction of a gaze, gaze location, dwell time on target, number of distinct glances and total dwell time. The gaze information may indicate whether the user is looking towards a front windshield, the user is looking down or looking at a user device, or the user is looking towards a rear of a vehicle, a rear camera display, a rear view mirror, or a side view mirror.

The gaze location may be the location where the user is looking. The dwell time on target may be the amount of time that a user spends looking at a given location/target before looking at something else. The number of distinct glances may be the number of times the user looks at an area after looking at another area. The total dwell time may be the sum of the dwell times for the number of distinct glances at a given area.

The vehicle system information may include information indicating a status provided by a vehicle system module 107 such as a vehicle control, a vehicle component, a vehicle power state, etc. The vehicle system information may be provided by sensors or devices such as one or more from among a Global Positioning System (GPS) device, a speedometer, an odometer, an engine sensor, an emission sensor, a transmission sensor, a tire pressure sensor, a door sensor, a trunk sensor, a window sensor, an interior/exterior temperature sensor, a barometric pressure sensor, an acceleration sensor, a gyroscopic sensor, a touch force or pressure sensor, a seat sensor, a passenger sensor, a collision sensor, an external object detector, an ultrasonic sensor, a radar sensor, a thermometer, an altimeter, an electronic control unit (e.g., an electronic controller, etc.), a car light activation sensor, an ambient light sensor, a car key sensor, a car information and entertainment device (i.e., an infotainment device), a communication device, etc.

The vehicle system information may include information on one or more from among an event associated with a vehicle, steering of a vehicle, turn indicator status, a speed of a vehicle, a location of a vehicle, an engine event or status, emission status, revolutions per minute of an engine, transmission status, tire pressure, door open/close status, trunk open/close status, window open/close status, interior/exterior temperature, barometric pressure, altitude of a vehicle, acceleration of a vehicle, user input, user applied pressure to an object or button in a vehicle, whether a passenger is in a seat, location and speed of external objects around the vehicle, which lights of a vehicle are activated, whether a car key is present in a vehicle, a currently displayed screen on a display in a vehicle, daytime or night time status, an amount of ambient light, a status of a vehicle, a status of a setting of a vehicle, and a location of a function that is executable by the user.

The vehicle environment information may include information provided by environment perception sensor 109. The vehicle environment information location may be a physical location in a three dimensional (3D) space around a user in which vehicle environment information is presented. For example, a stoplight may be located forward and below the eyes of the user and its location may be specified as being a given distance (x, y, and z) from the eyes of the user or other fixed point of reference. The vehicle environment information may include information about object exteneral to the vehicle including one or more form among coordinates, speed, temperature, acceleration, size, etc.

The output 104 outputs information in a visual, audible or haptic form or outputs a signal to cause another device to output information in the aforementioned forms. The output 104 may be controlled by the controller 101 to provide outputs to the user of the apparatus that assesses a gaze of an occupant 100. The output 104 may include one or more from among a speaker, a display, a heads up display, haptic feedback device, a vibration device, a tap-feedback device, a holographic display, etc. The output 104 may provide a warning to the occupant to keep eyes on the road, notify the occupant to take over steering of a vehicle, notify of disengaging automated vehicle driving controls, or notify of stopping the vehicle. The output information could also be used to generate a score for a driver or to characterize driver behavior before a crash event.

The gaze detection sensor 105 is configured to detect a location of a gaze of the user and a direction of movement of the gaze of the user and provide information on the location and the direction to the apparatus that assesses a gaze of an occupant 100 and the controller 101. The gaze detection sensor 105 may include one or more from among an infrared camera, a camera, a near infrared camera, an active light camera, an ultrasonic sensor, a radar device, etc. The gaze detection sensor 105 may provide the information to the controller 101 to be processed so that the controller 101 may perform functions based on one or more of the location of a gaze of the user, the location of the user, and the direction of movement of the gaze of the user.

The user input 106 is configured to provide input information and commands to the apparatus that assesses a gaze of an occupant 100. The user input 106 may be used to provide user inputs, etc. to the controller 101. The user input 106 may include one or more from among a touchscreen, a keyboard, a soft keypad, a button, a motion detector, a voice input detector, a microphone, a camera, a trackpad, a mouse, a touchpad, etc.

The vehicle system modules 107 may include one or more vehicle system modules (VSMs) in the form of electronic hardware components that are located throughout the vehicle and typically receive input from one or more sensors and use the sensed input to perform diagnostic monitoring, control the vehicle to perform maneuvers, accelerate, brake, decelerate, report and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions.

As examples, one VSM can be an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, another VSM can be the vehicle dynamics sensor that detects a steering wheel angle parameter, a yaw rate parameter, a speed parameter, an acceleration parameter, a lateral acceleration parameter, and/or a road wheel angle parameter, and another VSM can be a body control module that governs various electrical components located throughout the vehicle, like the vehicle's power door locks and headlights. As is appreciated by those skilled in the art, the above-mentioned VSMs are only examples of some of the modules that may be used in a vehicle, as numerous others are also available.

The communication device 108 may be used by apparatus that assesses a gaze of an occupant 100 to communicate with various types of external apparatuses according to various communication methods. The communication device 108 may be used to provide vehicle system information, vehicle environment information, gaze information, or mapping information, to the controller 101 and the apparatus that assesses a gaze of an occupant 100.

The communication device 108 may include various communication modules such as a broadcast receiving module, a near field communication (NFC) module, a GPS module, a wired communication module, and a wireless communication module. The broadcast receiving module may include a terrestrial broadcast receiving module including an antenna to receive a terrestrial broadcast signal, a demodulator, and an equalizer, and a digital multimedia broadcasting (DMB) module to receive and process a DMB broadcast signal. The NFC module is a module that communicates with an external apparatus located at a nearby distance according to an NFC method. The GPS module is a module that receives a GPS signal from a GPS satellite and detects a current location. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, or ZigBee.

The environment perception sensors 109 may include one or more from among a camera, a radar, an ultrasonic sensor, a LIDAR, and laser, an infrared sensor. The environment perception sensors 109 may provide vehicle environment information to the controller 101.

According to an exemplary embodiment, the controller 101 of the apparatus that assesses a gaze of an occupant 100 is configured to determine a direction of a gaze of an occupant based on gaze information detected by a first sensor, determine a position of a feature of road based on one or more from among mapping information or vehicle environment information provided by a second sensor, compare the direction of the gaze to the position of the feature of the road, and control to perform a corrective action in response to determining that the direction of the gaze does not correspond to the position of the feature of the road.

The controller 101 may be configured to compare the direction of the gaze to the position of the feature of the road by comparing the direction of the gaze to the curvature change or the elevation change of the road by identifying curve segment parameters or elevation change segment parameters and comparing the position of the gaze of the occupant to the curve segment parameters or the elevation change segment parameters at a plurality of points in time. The controller 101 may be further configured to compare the direction of the gaze to the position of the feature of the road by comparing the direction of the gaze to the curvature change or the elevation change of the road as or after the curve segment or the elevation change segment is traversed.

For example, the curve segment may be isolated or selected, the gaze of the occupant may be synchronized with the curve segment parameters or elevation change segment parameters, and divergent regions may be assessed for occupant inattention. To isolate or select the curve segment, the start and end is determined based on the following curve segment parameters, $$s_{t_1}^{t_2} = \text{drive segment from timestamp } t_1 \text{ and } t_2,$$

$C_t$=curvature value at time t, $C_{th}$=curvature threshold, and $t_{th}$=time threshold. The curve segments may be defined as the $$s_{t_1}^{t_2}$$

for which $t_1$ and $t_2$ are solutions to the following optimization problem:
  max $t_2-t_1$; Select maximal or entire segment;
  s.t. abs($C_t$)>$C_{th}$, ∀in $t_1$<t<$t_2$; Absolute value >threshold in segment; and
  $t_2-t_1$>$T_{th}$; Ignore short segments.

A gaze and forward-curvature signal synchronization may be used to compare the position of the gaze of the occupant to the curve segment parameters or the elevation change segment parameters at a plurality of points in time. The focus of the occupant may fluctuate with the curvature several meters ahead (as opposed to the curvature at the same spot, which is what the raw curvature signal contains). Thus, gaze information signal and the curve segment parameters signal may be synchronized for accurate comparison. In one example, an odograph signal c(t), from vehicle information that plots the course and distance traveled by a vehicle and is a function of a forward speed signal.

For a given gaze timestamp $t_i$, the timestamp at which the vehicle will be M meters ahead, $t_i^{+M}$, is the moment t that minimizes the difference between that future odometry value c(t) and the current reading M meters ahead:

$$t_i^{+M} := \arg\min_{t \in (t_i, t_n]} \{c(t) - (c(t_i) + M)\},$$

where $t_n$ represents the last timestamp at which the values are defined. To ensure access to all functions at $t_i$, it is easiest to synchronize all signal timestamps to those of the gaze signal.

The controller 101 may be configured to perform the corrective action by performing one or more from among providing a warning to the occupant to keep eyes on the road, notifying the occupant to take over steering of a vehicle, disengaging automated vehicle driving controls, and stopping the vehicle.

The controller 101 may be configured to compare the direction of the gaze to the position of the feature of the road by projecting the direction of the gaze to a first position on an image plane and projecting the position of the feature to a second position on the image plane and determining whether the first position is within a predetermined distance of the second position or the controller 101 may be configured to compare the direction of the gaze to the position of the feature of the road by determining whether the direction of the gaze is within a predetermined range set for a segment of the road being traveled on by the occupant. Further, the controller 101 may be configured to compare the direction of the gaze to the position of the feature of the road by determining whether the direction of the gaze corresponds to the position of the feature of the road for an amount greater than a threshold number over an analyzed period of time.

The projecting of the gaze and the projecting the position of the feature on to the image plane may be performed by defining a 2D plane within the field of view that is perpendicular to the longitudinal axis. The occupant may be determined to be looking at the feature if gaze direction and object coordinates overlap or not be looking at an object if Euclidean distance between gaze and feature coordinates is greater than a predetermined threshold distance. The gaze direction may be determined by stretching an eye direction to the image plane.

According to an example, the comparison may focus on regions with gaze divergence identified based on the difference between the curvature signal derived from the curve segment parameters and the horizontal gaze deviation derived from the gaze information of the occupant. Horizontal gaze deviation may be the deviation of the lateral gaze coordinate from its center value. The gaze signal and the curvature signal (or its equivalent for the case of the elevation) may be normalized based on mean and range values derived from an extensive number of drives. The normalized signals may then be compared to identify glance incongruences, either by thresholding the integral of their difference over that curve segment or by calculating the ratio of on/off-road glances or a ratio of the duration of the glances.

The feature of the road may be an object that is isolated so that gaze of the occupant can be compared with the feature. For example, the feature may be a traffic control object such as a traffic signal and the gaze of the occupant may be compared with respect to traffic signals. The data that will be compared on the focal plane are the gaze direction and the traffic signal location (with the necessary transformations to bring the values to the same reference system). The comparison may be performed independently for each of the lights traversed during a drive, so that the performance can be assessed at each one of feature of the road. To perform the comparison, the traffic signal must be isolated.

In one example, the traffic signal may be isolated by identifying the segment over which to analyze traffic signal gaze, where:

$s_{t1}^{t2}$=Drive segment from timestamp t1 to t2;
$z_t$=Longitudinal distance to the closest traffic signal at time t;
$z_{min}$, $z_{max}$=Minimal and maximal values of $z_t$;
$z_{th}$=Threshold for detection of difference in distance; and
$t_{th}$=Threshold for detection of time difference.

Traffic signal segments are defined as the $s_{t1}^{t2}$ for which $t_1$ and $t_2$ are solutions to the following optimization problem:

max $t_2-t_1$; Ensure maximal segment is selected (not a subset);
s.t. $z_{min} < z_t < z_{max}$, $\forall$t in $t_1 < t < t_2$; Filters for reliable detection distances;
$\Delta z_t < z_{th}$; Divide segments for large jumps; and
$\Delta t < t_{th}$; Divide segments based on time.

In this example, $\Delta z_t$ is the difference in the longitudinal distance to the closest traffic signal for two consecutive timestamps.

In another example, external perception sensors may provide coordinates of the object or traffic light with respect to the ground. In particular, the height of a traffic light (crucial for locating it correctly) may be determined with respect to the road surface. In this example, the locus of a look at the road is set on the focal plane and gaze at the traffic signal is determined based on gaze deviations from that point.

A linear model can be used to determine the center value of the focal plane, for example:

$y_t = b + a^T x_t + \beta^T v_t + \gamma^T p_t$, where b represents a baseline value, $x_t$ represents altitude and changes in altitude, $v_t$ represents forward speed and changes in forward speed, $p_t$ represents pitch and changes in pitch, and $a^T$, $\beta^T$, $\gamma^T$ are transposed coefficient vectors.

Deviations from the center value must be analyzed to identify the actual looks at traffic lights. A longitudinal distance to the signal ($z_t$) plays an important role here, since the closer an occupant is to the traffic light, the more noticeable their deviations become when looking at it. Three approaches may be used, and all are based on the difference between the registered vertical value of the projected gaze, $y_t$, and the approximated center, $\hat{y}_t$. By defining $x_t = y_t - \hat{y}_t$, we can empirically derive a threshold for the minimal expected value of $x_t$ in tiers, based on some set ranges for the value of $z_t$, define a formula that directly depends on $z_t$, for example $$x_t > \left(1 - \frac{z_t}{\alpha}\right) + \beta,$$

and consider the approximated center values sampled from a distribution and derive probabilistic bounds (based on the Chebychev inequality, for example) to identify outliers.

In yet another example, we can examine gaze information to determine gaze profile pattern and shape and identify traffic signal looking instances based on traffic signal location information. Patterns that fit the expected shape (rise and fall times), gaze density and fall within the expected gaze projection region may be isolated and stored. The patterns may then be compared to the gaze of the occupant to determine whether the occupant is gazing at the object or traffic signal. A machine learning-based approach trained on previously seen pairs of x_t and their corresponding indicator of looks at the traffic signal may be used to identify traffic signal looking instances.

A gaze may be matched with a feature of the road based on direction vectors, bypassing the projection onto the image plane. This is possible when the gaze detection sensor 105 provides a normalized eye direction and an eye position. If the location of the feature of the road is known in a first reference system, the normalized vector between the eye position and the location of the road feature can be compared to an expected gaze direction for the feature of the road. The directions can be compared using a central angle between the vectors and setting a threshold to the central angle. The threshold may vary based on the distance to the feature of the road. If the central angle falls within the threshold, the gaze may be determined to correspond to the feature of the road.

Figure 2:
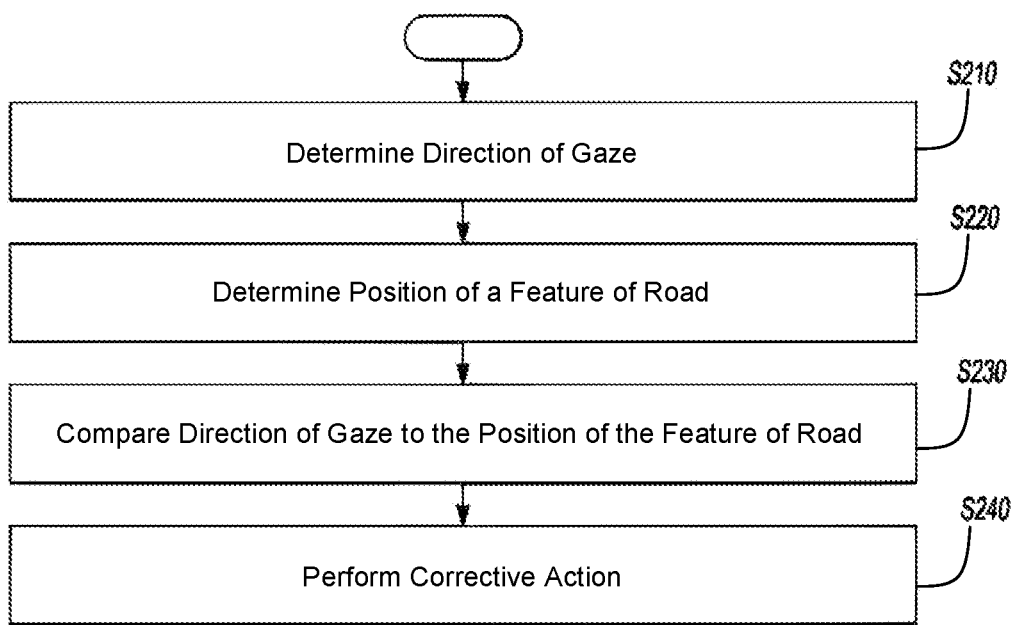
FIG. 2 shows a flowchart for a method of assessing a gaze of an occupant according to an exemplary embodiment.

FIG. 2 shows a flowchart for a method of assessing a gaze of an occupant according to an exemplary embodiment. The method of FIG. 2 may be performed by the apparatus that assesses a gaze of an occupant 100 or may be encoded into a computer readable medium as instructions that are executable by a computer to perform the method.

Referring to FIG. 2, a direction of a gaze of an occupant is determined based on gaze information detected by a first sensor in operation S210. In operation S220, a position of a feature of road is determined based on one or more from among mapping information or vehicle environment information provided by a second sensor.

After the position of the feature of the road and the direction of the gaze are determined, the direction of the gaze is compared to the position of the feature of the road in operation S230. If the direction of the gaze does not correspond to the position of the feature of the road, a corrective action is performed in operation S240.

Figure 3A:
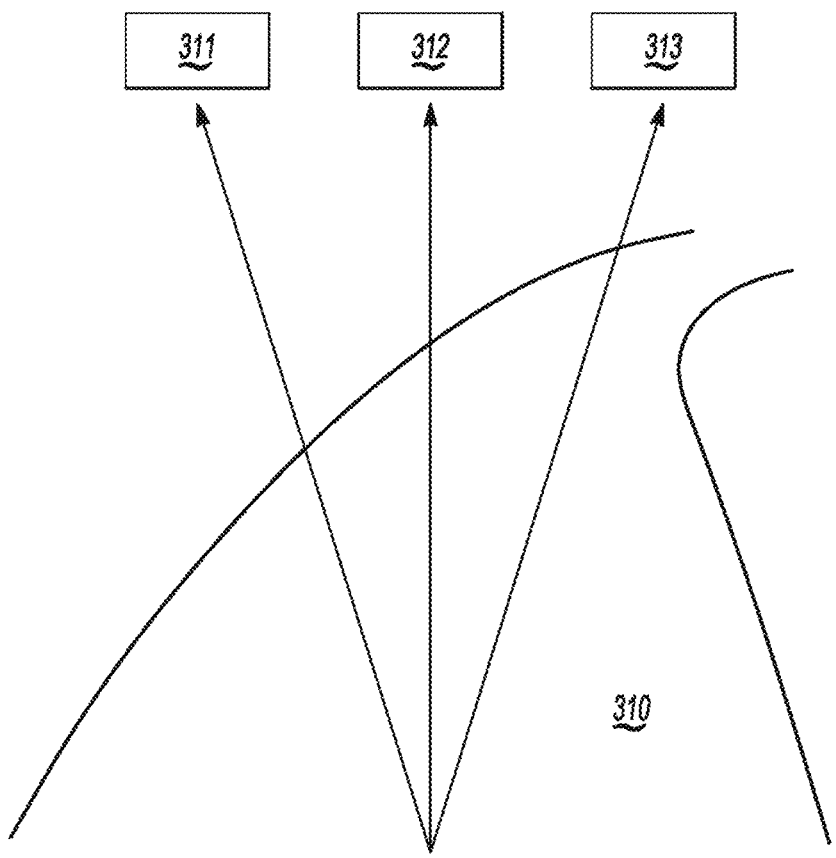
FIGS. 3A-3D show example illustrations of occupant gaze assessment as it relates to road geometry according to an aspect of an exemplary embodiment.

FIGS. 3A-3D show examples illustrations of occupant gaze assessment as it relates to road geometry according to an aspect of an exemplary embodiment. Referring to FIG. 3A, a vehicle approaches an area where a road or path 310 curves. A system may assess whether an occupant is gazing in a direction that is away from the road or path 311 or looking straight ahead 312. However, while approaching a curve, it is desirable to have an occupant gazing in the direction of the curved path 313 to ensure that there are no obstacles or that an automated driving system is properly functioning.

Figure 3B:
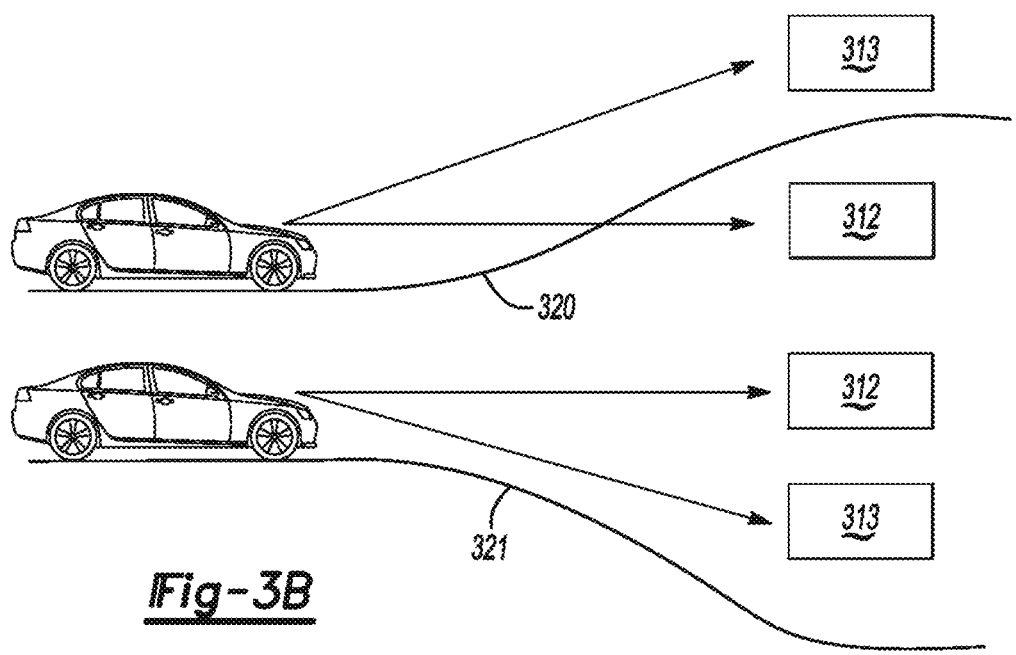

Referring to FIG. 3B, a system that assesses whether an occupant is looking straight ahead 312 may not determine whether the occupant's gaze is corresponds to an elevation change in paths 320 and 321. Therefore, when approaching an elevated path 320, gaze information may be processed to determine whether an occupant is looking up in direction of the path and when approaching a decreasing elevation path 321, gaze information may be processed to determine whether an occupant is looking down in the direction of the path 321 with the decreasing elevation or downward slope.

Figure 3C:
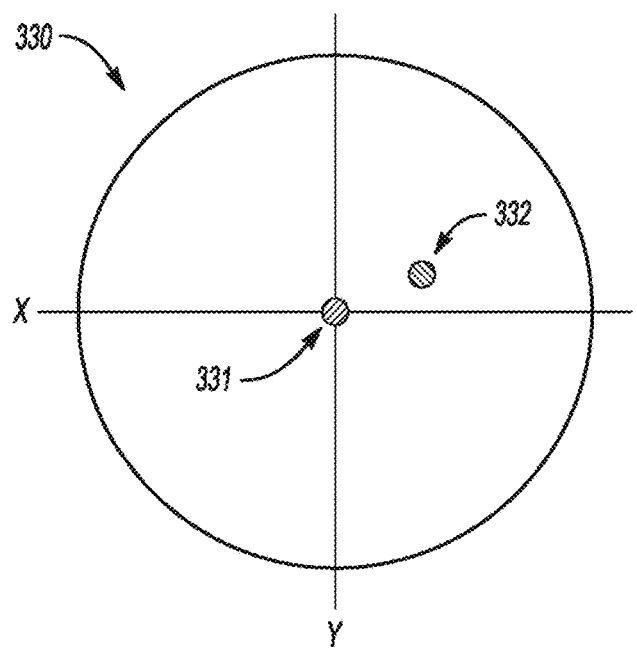

Referring to FIG. 3C, illustration 330 shows that the focal point of an occupant may shift from a first position 331 corresponding to straight or level road to a second position 332 in response to elevation or curvature changes of a path. This shift of direction of the focal point can be compared to a predetermined or prestored focal point position corresponding to the point on the path or road to determine whether the direction of the gaze of the occupant corresponds to changes in elevation or curvature changes of a path or road. In another example, the shifted focal point with the second position 332 or can be compared to a calculated focal point position calculated as a function of the position on the path or road. The comparison can determine that the gaze direction of the occupant corresponds to the feature of the road, in this case the curvature or elevation change, if the calculated focal position or the prestored focal position is within a predetermined threshold of the focal point of the occupant determined from gaze information.

Figure 3D:
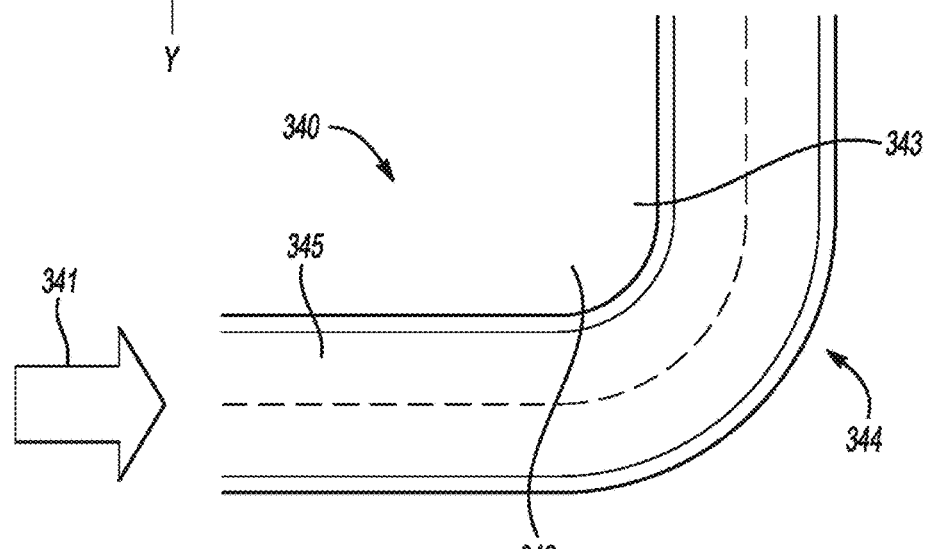

Referring to FIG. 3D, an illustration 340 shows that a vehicle is traveling in direction 341 along path 345. The direction of the gaze of the occupant may be assessed over a time period or location corresponding to the start of curved path 342 and the end of the curved path 343. This direction of the gaze of the occupant during this segment 344 may be compared to the road segment.

Figure 4A:
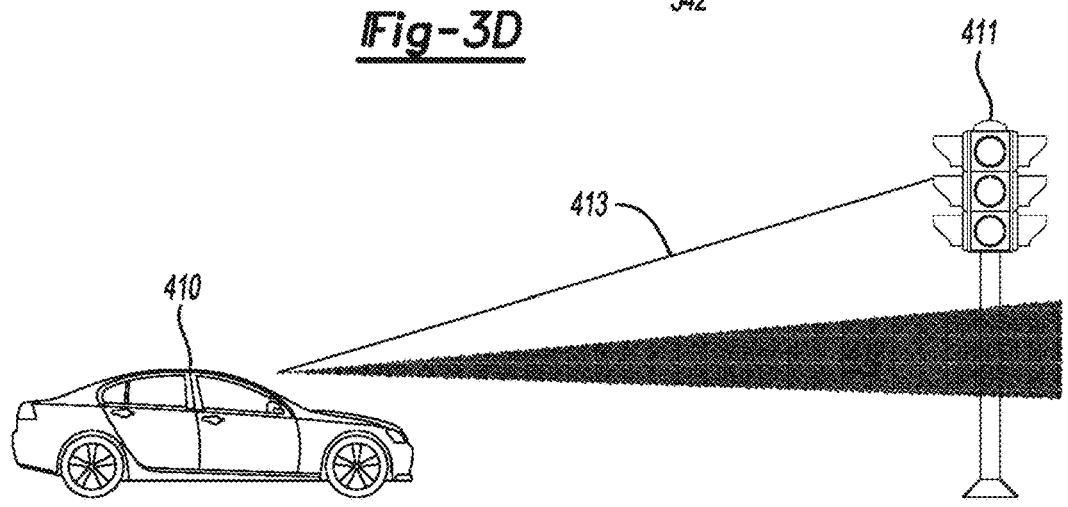
FIGS. 4A-4C show example illustrations of occupant gaze assessment as it relates to objects on a path according to an aspect of an exemplary embodiment.
Figure 4B:
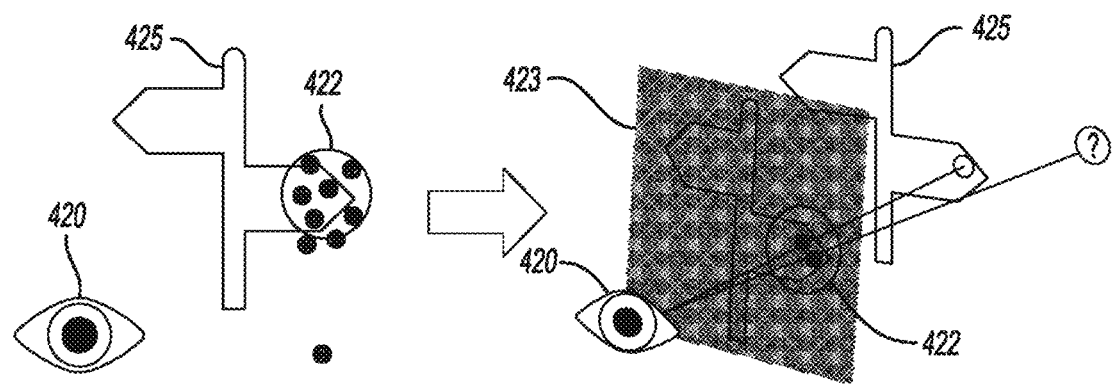
Figure 4C:
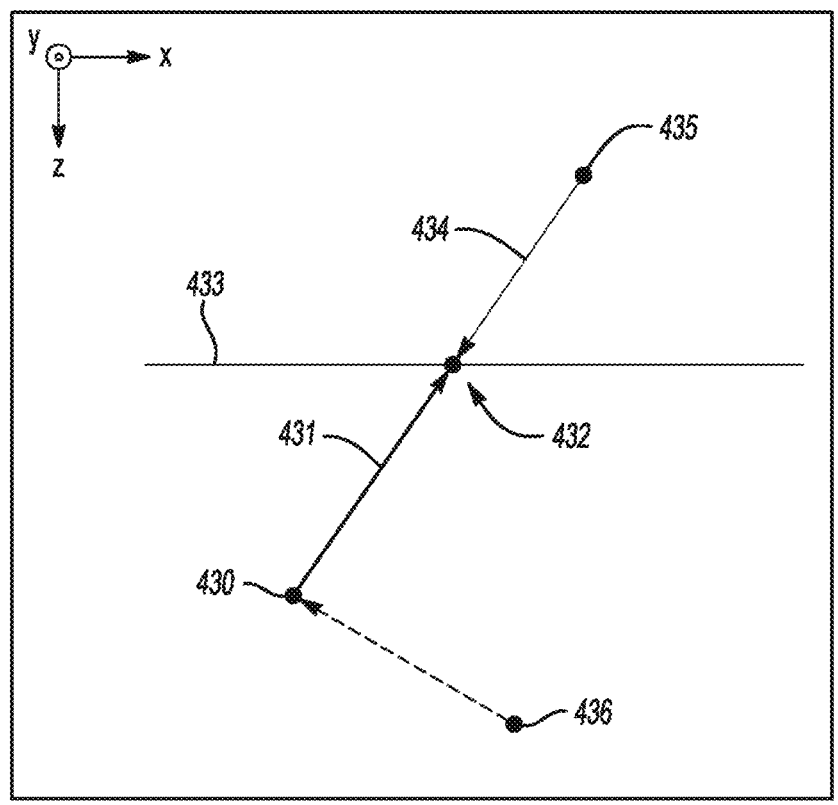

FIGS. 4A-4C show example illustrations of occupant gaze assessment as it relates to objects on a path according to an aspect of an exemplary embodiment.

Referring to FIG. 4A, a vehicle 410 approaches a feature of the road, in this case an object or traffic light 411. In this case, a system that assesses whether an occupant is looking straight ahead 412 may not determine whether the occupant's gaze is corresponds to the traffic light 411. Thus, gaze information of an occupant and position information of the object 411 must be analyzed to determine whether the occupant is gazing at the object 411.

Referring to FIG. 4B, gaze information corresponding to a gaze of an occupant 420 and vehicle environment information corresponding to an object 425 are gathered. The information 422 is projected onto plane 423 to be analyzed and compared to determine whether the direction of the gaze of the occupant corresponds to the position of the object based on the points projected onto image plane 423.

Referring to FIG. 4C, a detailed view of projecting gaze information corresponding to a gaze of an occupant 420 and vehicle environment information corresponding to an object 425 is shown. In particular, eye position 430 is determined by a sensor 436. The eye position is used to determine the gaze vector or the gaze direction 431. This gaze direction is then projected onto image plane 433. Further, the position of the object 435 is determined and is projected 434 using a vector onto image plane 433. The projected data 432 is then used to determine whether the direction of the gaze corresponds to the obstacle position.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method of assessing a gaze of an occupant, the method comprising:
   determining a direction of a gaze of an occupant of an autonomous or semi- autonomous vehicle based on gaze information detected by a first sensor;
   determining curvature changes or elevation changes of a road based on vehicle environment information provided by a second sensor comprising one or more from among a camera, a radar, an ultrasonic sensor, a LIDAR, a laser, and an infrared sensor;
   assessing whether the direction of the gaze is a) away from the road or straight ahead, or b) in the direction of the curvature change or elevation change, the assessing comprising identifying curve segment parameters or elevation change segment parameters of the road, synchronizing the curve segment parameters or elevation change segment parameters with the gaze, and comparing the direction of the gaze to the synchronized curve segment parameters or elevation change segment parameters at a plurality of points in time; and performing a corrective action in response to determining that the direction of the gaze does not correspond to the direction of the curvature change or elevation change, wherein the performing the corrective action comprises one or more from among disengaging automated vehicle driving controls and stopping the autonomous or semi-autonomous vehicle.

2. The method of claim 1, wherein the curve segment parameters or the elevation change segment parameters are identified from the vehicle environment information provided by the second sensor, and wherein the assessing is performed after a curve segment or an elevation change segment is traversed.

3. The method of claim 1, wherein the performing the corrective action further comprises one or more from among providing a warning to the occupant to keep eyes on the road, and notifying the occupant to take over steering of the autonomous or semi-autonomous vehicle.

4. The method of claim 1, further comprising determining a position of a traffic control object or device based on the vehicle environment information provided by the second sensor and projecting the direction of the gaze to a first position on an image plane and projecting the position of the traffic control object or device to a second position on the image plane and determining whether the first position is within a predetermined distance of the second position.

5. The method of claim 1, further comprising determining a position of a traffic control object or device based on the vehicle environment information provided by the second sensor and comparing information on a normalized vector between an eye direction and an eye position to an expected gaze direction for the traffic control object or device.

6. An apparatus that assesses a gaze of an occupant, the apparatus comprising:

at least one memory comprising computer executable instructions; and at least one processor configured to read and execute the computer executable instructions, the computer executable instructions causing the at least one processor to:

determine a direction of a gaze of an occupant of an autonomous or semi- autonomous vehicle based on gaze information detected by a first sensor;

determine curvature changes or elevation changes of a road based on vehicle environment information provided by a second sensor comprising one or more from among a camera, a radar, an ultrasonic sensor, a LIDAR, a laser, and an infrared sensor;

assess whether the direction of the gaze is a) away from the road or straight ahead, or b) in the direction of the curvature change or elevation change, the assessing comprising identifying curve segment parameters or elevation change segment parameters of the road, synchronizing the curve segment parameters or elevation change segment parameters with the gaze, and comparing the direction of the gaze to the synchronized curve segment parameters or elevation change segment parameters at a plurality of points in time; and perform a corrective action in response to determining that the direction of the gaze does not correspond to the direction of the curvature change or elevation change, wherein the performing the corrective action comprises one or more from among disengaging automated vehicle driving controls and stopping the autonomous or semi-autonomous vehicle.

7. The apparatus of claim 6, wherein the curve segment parameters or the elevation change segment parameters are identified from the vehicle environment information provided by the sensor, and wherein the assessing is performed after a curve segment or an elevation change segment is traversed.

8. The apparatus of claim 6, wherein the performing the corrective action further comprises performing one or more from among providing a warning to the occupant to keep eyes on the road, and notifying the occupant to take over steering of the autonomous or semi-autonomous vehicle.

9. The apparatus of claim 6, wherein the computer executable instructions further cause the at least one processor to determine a position of a traffic control object or device based on the vehicle environment information provided by the second sensor and project the direction of the gaze to a first position on an image plane and projecting the position of the traffic control object or device to a second position on the image plane and determining whether the first position is within a predetermined distance of the second position.

* * * * *